United States Patent [19]

Thompson

[11] Patent Number: 4,811,857

[45] Date of Patent: Mar. 14, 1989

[54] CLOSURE SYSTEM AND METHOD OF FORMING AND USING SAME

[75] Inventor: Mortimer S. Thompson, Maumee, Ohio

[73] Assignee: Tri-Tech Systems International Inc., Maumee, Ohio

[21] Appl. No.: 63,162

[22] Filed: Jun. 17, 1987

[51] Int. Cl.[4] .............................................. B65D 53/02
[52] U.S. Cl. .................................... 215/329; 215/31; 215/344; 215/DIG. 1; 53/421; 53/485; 53/490; 53/492
[58] Field of Search .................. 215/262, 344, 307, 31, 215/295, 318, 321, 329, 340; 53/421, 485, 490, 492

[56]  References Cited

U.S. PATENT DOCUMENTS

| | | |
|---|---|---|
| 521,788 | 6/1894 | Flanigan . |
| 958,513 | 7/1910 | Love . |
| 1,770,548 | 7/1930 | Oven . |
| 2,340,353 | 2/1944 | Weaver ................................ 215/31 |
| 2,385,105 | 5/1959 | Heyl et al. . |
| 2,423,295 | 7/1947 | Crabbe et al. ..................... 215/31 X |
| 2,447,340 | 8/1948 | Jackson . |
| 2,456,560 | 12/1948 | Keith . |
| 2,852,054 | 9/1958 | Motley . |
| 2,961,119 | 11/1960 | Leach . |
| 3,038,624 | 6/1962 | Wieckmann . |
| 3,065,677 | 11/1962 | Loeser . |
| 3,171,453 | 3/1965 | Strong . |
| 3,200,981 | 8/1965 | Harding . |
| 3,243,851 | 4/1966 | Reitter, Jr. et al. . |
| 3,250,417 | 5/1966 | Powers, Jr. et al. . |
| 3,272,369 | 9/1966 | Grimsley . |
| 3,285,452 | 11/1956 | Moloney et al. ................. 215/31 X |
| 3,285,452 | 11/1966 | Moloney et al. . |
| 3,286,866 | 11/1966 | McIntosh ....................... 215/344 X |
| 3,339,770 | 9/1967 | Weigand . |
| 3,343,700 | 9/1967 | Heubl . |
| 3,344,942 | 10/1967 | Hedgewick . |
| 3,348,717 | 10/1967 | Treanor . |
| 3,352,127 | 11/1967 | Skinner, Sr. . |
| 3,352,448 | 11/1967 | Livingstone . |
| 3,374,913 | 3/1968 | Zipper . |
| 3,405,439 | 10/1968 | Uemura . |
| 3,418,409 | 12/1968 | Hesse et al. . |
| 3,460,708 | 8/1969 | Leftault, Jr. . |
| 3,482,725 | 12/1969 | Exton . |
| 3,532,786 | 10/1970 | Coffman . |
| 3,557,275 | 1/1971 | Longshaw et al. . |
| 3,557,985 | 1/1971 | St. Denis et al. . |
| 3,567,233 | 3/1971 | Stephanich . |
| 3,612,324 | 10/1971 | Malick . |
| 3,613,929 | 10/1971 | Treanor . |

(List continued on next page.)

FOREIGN PATENT DOCUMENTS

| | | |
|---|---|---|
| 764429 | 3/1971 | Belgium . |
| 0049876 | 10/1981 | European Pat. Off. . |
| 1811318 | 7/1969 | Fed. Rep. of Germany . |
| 2829755 | 1/1980 | Fed. Rep. of Germany . |
| 3523771 | 1/1987 | Fed. Rep. of Germany . |
| 555488 | 3/1923 | France . |
| 2306135 | 4/1976 | France . |
| 2378689 | 1/1978 | France . |
| 351515 | 1/1961 | Switzerland . |
| 607702 | 8/1975 | Switzerland . |
| 788148 | 8/1956 | United Kingdom . |
| 930866 | 8/1956 | United Kingdom . |
| 1024762 | 10/1962 | United Kingdom . |
| 1048727 | 3/1965 | United Kingdom . |

OTHER PUBLICATIONS

Cyrogenics (Jul. 1980)–M. Shinohara, T. Kugo, and K. Ono Superleak-Tight Stainless Steel Hollow O-Ring Seals For Cryogenic Use.

*Primary Examiner*—Donald F. Norton
*Attorney, Agent, or Firm*—Hedman, Gibson, Costigan & Hoare

[57]  ABSTRACT

A closure system including a cap and a container, the cap having a seal adapted to be deformed by a deformation producing arrangement in the lip of the container which causes the seal to deformed wherein when the cap is moved and the deformation in the seal is no longer aligned with the deformation producing arrangement in the container the seal is broken. Caps and containers included within the system and methods of manufacture and use of the system are also disclosed.

17 Claims, 2 Drawing Sheets

U.S. PATENT DOCUMENTS

| | | |
|---|---|---|
| 3,784,041 | 1/1974 | Birch . |
| 3,820,799 | 6/1974 | Abbes et al. . |
| 3,861,551 | 1/1975 | Hannon . |
| 4,016,996 | 4/1977 | Aichinger et al. . |
| 4,069,937 | 1/1978 | Smalley . |
| 4,090,631 | 5/1978 | Grussen . |
| 4,091,948 | 5/1978 | Northup . |
| 4,141,463 | 2/1979 | Smith . |
| 4,143,785 | 3/1979 | Ferrell . |
| 4,153,172 | 5/1979 | Bialobrzeski . |
| 4,196,818 | 4/1980 | Brownbill . |
| 4,202,462 | 5/1980 | Imber . |
| 4,206,852 | 6/1980 | Dunn et al. . |
| 4,209,102 | 6/1980 | Dunn et al. . |
| 4,210,251 | 7/1980 | Grussen . |
| 4,218,067 | 8/1980 | Halling . |
| 4,253,581 | 3/1981 | Aichinger et al. . |
| 4,257,525 | 3/1981 | Thompson . |
| 4,274,544 | 6/1981 | Westfall . |
| 4,281,774 | 8/1981 | Mumford . |
| 4,281,979 | 8/1981 | Doherty . |
| 4,290,614 | 9/1981 | Moll . |
| 4,343,408 | 8/1982 | Csaszar . |
| 4,345,692 | 8/1982 | Obrist et al. . |
| 4,360,114 | 11/1982 | Owens . |
| 4,360,149 | 11/1982 | Hein . |
| 4,386,044 | 5/1983 | Arndt et al. . |
| 4,392,579 | 7/1983 | Uhlig et al. . |
| 4,394,918 | 7/1983 | Grussen . |
| 4,418,828 | 12/1983 | Wilde et al. . |
| 4,442,947 | 4/1984 | Banich, Sr. . |
| 4,470,513 | 9/1984 | Ostrowsky . |
| 4,475,274 | 10/1984 | Beckstrom et al. . |
| 4,497,765 | 2/1985 | Wilde et al. . |
| 4,506,795 | 3/1985 | Herr . |
| 4,550,844 | 11/1985 | Lininger . |
| 4,552,279 | 11/1985 | Mueller et al. . |
| 4,563,325 | 1/1986 | Coffman . |
| 4,595,547 | 6/1986 | Herr . |

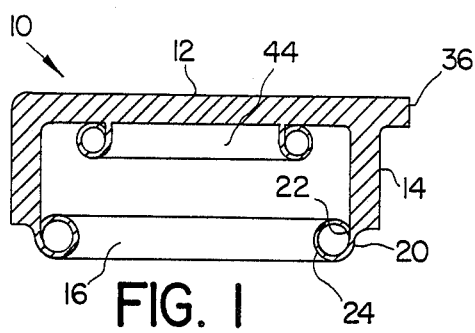
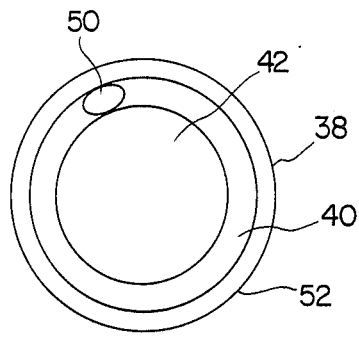
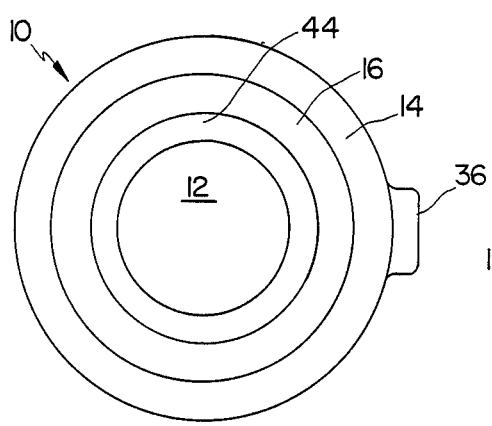
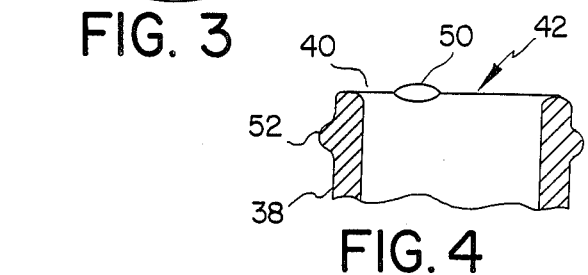
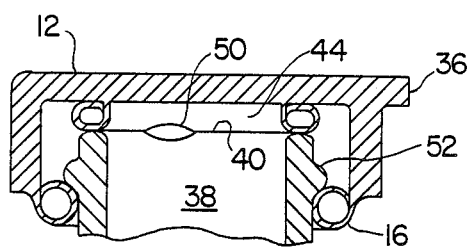
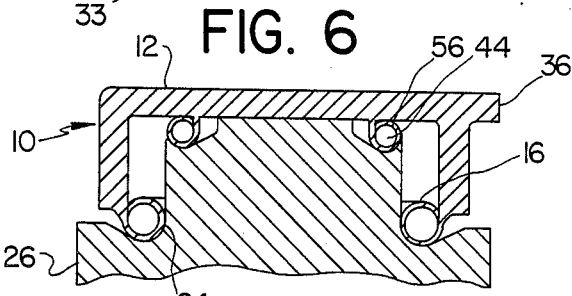
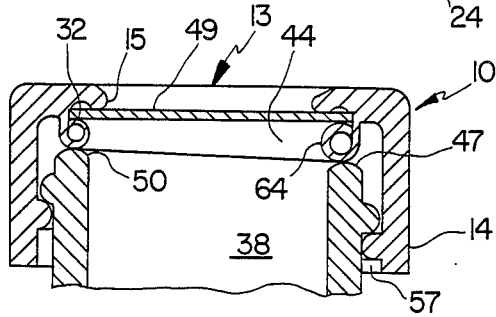

CLOSURE SYSTEM AND METHOD OF FORMING AND USING SAME

FIELD OF THE INVENTION

This invention relates to caps and containers for vacuum packed and pressurized products and to the methods of and apparatus for forming such caps and containers.

BACKGROUND OF THE INVENTION

Vacuum packed and pressurized products have long presented problems and difficulty in removing caps from their containers. Under vacuum the lids and sealing liners are held substantially tighter than without and caps are very difficult to lift off, in the case of snap caps, or twist-off, in the case of threaded caps until the seal is broken typically without special means for doing so, and the vacuum released.

Caps on pressurized containers, on the other hand, have problems with premature cap blow-off relating to the loss of thread engagement before the internal pressure is released resulting in many personal injuries and large financial loss.

SUMMARY OF THE INVENTION

In accordance with the present invention, there is provided a new and unique closure system for closing a package for a vacuum packed or pressurized product consisting of a container and a cap, wherein the closure provides a means for breaking the seal and the vacuum to lessen the force required for cap removal on the one hand, or on the other releasing the internal pressure to assure the safe removal of the cap by venting said pressure. The closure of the invention has an opening surrounded by sealing surfaces which develop a greater seal compression in one portion relative to the remainder of the sealing surfaces. When the cap is twisted relative to the container, its most highly compressed sealing portion moves to a new location where it loses its sealing contact and any vacuum or pressure is released.

Generally the cap of the invention has a lid including a sealing means and a depending annular skirt including means for engaging a container. The container of the invention has an opening surrounded by a neck including a lip which has therein means for deforming the sealing means of the cap which may be a protuberance on its sealing surface as well as a means for a closing engagement with the cap. As the package is closed, preferably at elevated temperature, the cap sealing means seals the container neck, including the protuberance therein. At ambient temperatures when the cap is opened by twisting, the initial relative motion causes the protuberance to break the seal and vacuum or pressure making it easier to complete the cap removal. Alternatively the sealing surface of the container may be biased or sloped from a region of maximum height to a region of lesser height without a protuberance so that decompression is more gradual when the cap is removed.

The cap of the invention may be a snap cap wherein the cap is snapped on to the container neck during capping and snapped off the container by the consumer after first twisting it to break the seal and the vacuum, or the cap may be threaded wherein the initial twisting motion breaks the seal and vacuum or pressure to facilitate the further removal of the cap.

The seal of the cap may be a linerless seal similar to those described in my copending application Ser. No. 809,058, now U.S. Pat. No. 4,708,255 and my copending applications, Ser. Nos. 060,217, filed June 10, 1987, and 061,304, filed June 17, 1987, the entire disclosure of each being incorporated herein by reference. Optionally, the cap may have a liner or an alternative linerless seal.

In the practice of the invention, the sizes of the caps typically may be threaded or have a snap-fit engagement and range from about 20 mm to 120 mm and bottle and/or jar sizes range from about 2 ounces to 128 ounce capacity.

Useful plastics which can be used for forming the caps and linerless seals of the invention include polypropylene, polyethylene, polystyrene, acrylonitrile-styrene-butadiene polymers, and other semi-rigid to rigid plastic materials.

The caps of the present invention can be employed a wide variety of uses including combinations with other materials (e.g., caps having metal lid portions or portions utilizing different plastics). Such caps may be used to close and seal a wide variety of plastic, glass and metal containers for a wide variety of products and foods, including:

beverages, including carbonated soft drinks and pasteurized beverages such as beer;

foods, especially those which are vacuum packed and/or where container sealing performance is critical, including oxygen sensitive foods such as mayonnaise or tomato based products, etc and corrosive foods such as vinegar, lemon juice, etc.

The invention in its broader aspects is not limited to the specific described embodiments and departures may be made therefrom within the scope of the accompanying claims without departing from the principles of the invention and without sacrificing its chief advantages.

BRIEF DESCRIPTION OF THE DRAWINGS

FIG. 1 is a longitudinal cross sectional view of one embodiment of the invention, illustrating a cap having a linerless seal, a skirt and a compressible and resilient curled free end for engagement with a container for closing and opening.

FIG. 2 is a bottom plan view of FIG. 1.

FIG. 3 is a top plan view of a container, neck having a protuberance on the lid thereof which may be closed and opened in accordance with the present invention.

FIG. 4 is a longitudinal cross-sectional view of FIG. 3.

FIG. 5 is a longitudinal sectional view of the cap of FIGS. 1 and 2 in engagement with the container of FIGS. 3 and 4 showing the engagement of the linerless seal of the cap and the protuberance of the lid as well as the cap curled free end with the thread portion and annular bead of the container.

FIG. 6 is a longitudinal sectional view illustrating a preformed cap and a tool for curling the free end in the depending wall of the cap.

FIG. 7 generally is the same as FIG. 6 except that the tool has engaged and formed the curled free end in the depending wall of a cap of the invention.

FIG. 8 is a longitudinal sectional view of another embodiment of the invention, illustrating a cap of the invention in sealed relationship with the container wherein the lid is sloped downward from a region of maximum height.

DETAILED DESCRIPTION OF THE DRAWINGS

Figure 9:
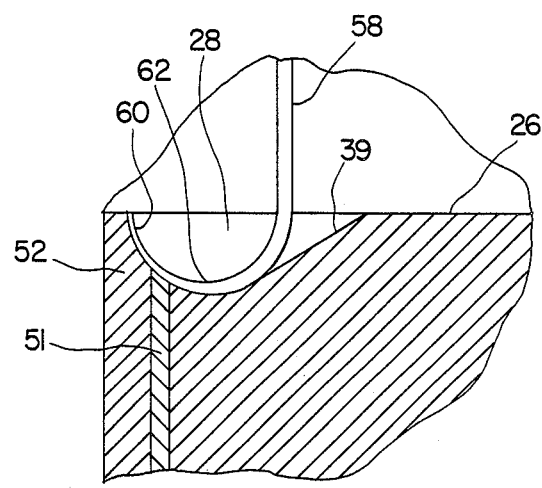
FIG. 9 is an enlarged sectional view of an embodiment of the invention for curling the free end of the inner depending wall of the cap, wherein the partially curled free end is heated by the outer portion of the curling tool.

Referring to FIGS. 1 to 5, there is shown a semi-rigid plastic cap 10 and a cooperating container neck 38 of the invention. The cap 10 has a lid 12 with a lift tab 36 and an integral depending linerless seal 44 and a depending peripheral skirt 14 including an interfering ring 16. The ring 16 has an upper end 20 integral with the skirt 14 and a curled portion 24 including a free end 22. The container neck 38 has a bore or opening 42, a rim or lip 40 with a protuberance 50 thereon, and an annular external bead 52. FIG. 3 shows the cap 10 in a closed and sealed engagement with the container neck 38. To produce the engagement, the curled portion 24 of the interfering ring 16 is forced past the neck bead 52 by its compression through the ovaling of its hollow cross section and a further coiling of its coiled "O" shape.

When the cap 10 and container neck 38 are used for vacuum packed products, they are engaged while hot and then cool after engagement along with the enclosed product. The cooling produces an internal vacuum which acts to hold the cap 10 and container neck 38 together and to resist their separation.

The closing engagement of cap 10 with container neck 38 depends mostly upon the compressing forces generated by the vacuum upon its sealing components, the rim 40 and the linerless seal 44. During capping the protuberance 50 does not present a sealing problem because of the high compressibility of the O-shape linerless seal 44. The high temperatures used add to such compressibility. However, during cap removal at ambient conditions the protuberance 50 is advantageously used to break the seal and the vacuum when the cap 10 is first twisted relative to the neck 38 so that the compressive force thereby released allows the cap 10 to be simply removed by lifting the tab 36 in a snapcap fashion. Thereafter, the container may be reclosed and opened again as a snap cap. The protuberance 50 on the rim of the container may be provided in a manner known to those skilled in the art such as by molding, etc.

Alternatively, the seal of cap 10 may be a separate liner or a different linerless design.

Referring to FIGS. 6 and 7, there is shown a preferred method of forming the curled portions 24 and 56 of the interfering ring 16 and linerless seal 44. In FIG. 6 the cap 10 already has been formed by conventional molding techniques, such as injection molding, with a vertical cylindrical or tubular wall 18 having its upper end 20 integral with the skirt 14 and with its lower free end 22 ready for curling by the illustrated curling tool 26. As shown in FIG. 6, the wall 18 and the curl 24 are free of abrupt changes in thickness.

The curled portion 24 of the seal 16 is formed with a curling tool 26, in which in FIG. 6 has been positioned within the cap 10 ready to engage the preformed wall 18 at its lip or rim 30. The curling tool 26 includes a circular or annular groove 28a of a concave cross section suitable for shaping and dimensioning the curled portion 24.

As shown in FIG. 7, the forming operation is accomplished by pressing the groove 28a of the tool against the rim 30 of the wall 18. In this embodiment the deepest portion 33 of the groove 28a representing the center of its concavity is located inwardly of the cylindrical plane of the wall 18. Also the groove 28 has a slanted portion 39a, outwardly and tangent to its concavity to facilitate centering of the tool and cap. As movement of tool 26 relative to the wall 18 continues toward the lid 12, the cylindrical sides of the wall 18 are centered within groove 28a by the slanted portions 39a and are then forced inwardly and then upwardly and finally outwardly in response to its plastic memory to assume the desired curved shape having an "O" cross section. At the same time the groove 28b of tool 26 performs the same operation on wall 58 to produce the O-shape linerless seal 44 having curled portion 56.

To facilitate the curling operation, in the case of polypropylene, the tool 26 may be at a temperature of about ambient to about 300 degrees F. but preferably about 150 to about 300 degrees F. for curling cycles of about one-half to two seconds for the interfering ring and between ambient and 150° F. for the linerless seal 44. The curl radius of the grooves 28a and 28b and the resultant rings 16 and 44 may range from 0.030 to 0.100 inches or larger when used in conjunction with wall 18 thicknesses of about 0.003 to 0.025 inches. The thickness of wall 18 may desirably be tapered to include free ends 22 of about 0.003 to 0.015 inches and upper ends 20 of from 0.010 to 0.025 inches.

In addition to the implementation of the invention as a snap cap 10, the engaging means may employ a threaded or other twist type engagement with the protuberance 50 advantageously breaking the seal.

Referring now to FIG. 8 there is shown a threaded cap 10 including a separate lid and a container neck 38 suitable for the practice of the invention with containers which contain either internal pressure or vacuum. The cap 10, as molded, includes a lid 12 having a central opening 13 and a skirt 14 including threads 57, wherein the threads can be continous or discontinuous. The central opening 13 is bounded at the lid 12 upper surface by an inward projection 15 and at its lower surface by the linerless seal 44. Located in the opening 13 is a metal lid portion 49 whose upper surface abuts the lid inward projection 15 and whose lower surface abuts the upper surface 32 of the seal 44. FIG. 8 shows the cap 10 with its metal lid portion 49 after the wall 58 has been curled by the method of the invention as shown in FIGS. 6 and 7 except that the curled portion 64 of the seal 44 is inwardly directed so as to fixedly engage the metal lid portion 49 in a sealing engagement. The container neck 38 includes a rim 40 which is higher on one side 50 than on its opposing side 47 so that the linerless seal 44 thereat is more highly compressed. The cap 10 is shown after capping the container neck 38 and the curled portion 64 of its linerless seal 44 performs a sealing engagement with the container neck rim 40 and its higher portion 50 as well as its lower portion 47 and additionally the cap metal lid portion 49. Optionally the central lid portion 49 may be made of other materials such as plastics which offer transparency, barrier, cost or other advantages. Upon uncapping the cap 10 is first twisted and with the circumferential movement of the linerless seal 44 relative to the container lip higher portion 50, the seal and internal pressure or vacuum are broken and the further removal of the cap 10 is made safe or otherwise facilitated.

Figure 10:
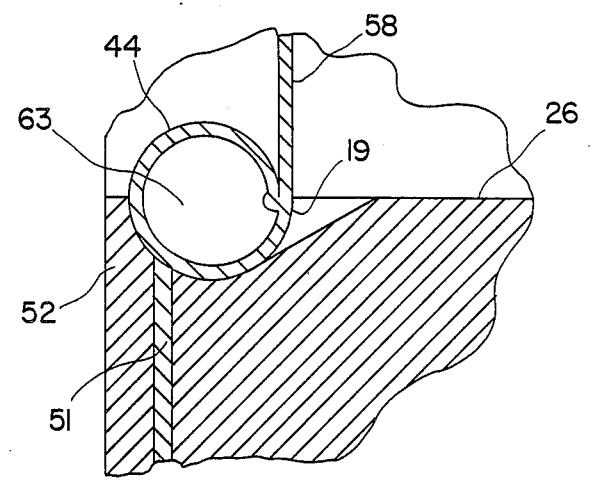
FIG. 10 is generally the same as FIG. 9, except that the heated free end has been fully curled and welded to the depending wall of the cap.

Referring now to FIGS. 9 and 10 there is shown another embodiment of the invention wherein a hollow shaped ring is formed and welded to enclose a hollow space 63 thereby creating an article having pneumatic qualities useful for sealing on one hand or as an interfering element on the other. FIG. 9 shows a wall 58 with its free end partially curled by a tool 26. The tool 26 includes an annular groove 28 a portion of which is bounded by an annular tool insert 52 for heating at a high temperature and an insulating portion 51 to allow the remainder of tool 26 to be operated at a lower temperature. The free end 62 has a rim 60 which has a reduced thickness which can be heated to a melting temperature more quickly than the remainder of free end 62. The heated tool insert 52 is heated to a temperature sufficiently above the melting point of the plastic to melt the rim 60 of reduced thickness but not high enough to melt the thicker succeeding portions of free end 62 as it passes in contact with it during curling to form an O-shape ring 44 of free end 62. When the melted rim 60 completes its curling it contacts the wall 18 and forms a welded attachment 19 therewith as shown in FIG. 10. The resultant curled free end 44 is thereby prevented from any possibility of being uncurled as well as converted into a pneumatic shape. Optionally the curled free end 44 may be welded or otherwise bonded by other means after the O-shape cross section has been formed.

I claim:

1. A container-cap combination for containing, a product comprising:
   a container comprising:
   (a) an opening for receiving or discharging the product,
   (b) a neck surrounding the opening including a sealing surface; and
   (c) means integral with said sealing surface adapted to produce a region of greater deformation in a portion of a sealing means than in the remainder of the sealing means of a cap when the cap is in sealed relationship with the container sealing surface;
   a cap comprising:
   (a) a top wall; and
   (b) sealing means containing plastic and adapted to form a seal between the cap and the opening of the container, a portion of the sealing means having a region of greater deformation than the remainder of the sealing means when the cap is placed in sealed relationship with the container.

2. The container-cap combination of claim 1, wherein the cap further comprises a depending skirt having a bottom end and an annular projection integral with the bottom end of the skirt and said container further comprises engaging means integral with the neck for engaging the bottom end of the skirt to thereby secure the cap in sealed relationship to the container.

3. The container-cap combination of claim 2, wherein the bottom end of the skirt has a curled free end portion and wherein the engaging means of the container engages the curled free end portion of the cap.

4. The container-cap combination of claim 3, wherein the curled free end has a continuous substantially circular cross-section.

5. The container-cap combination of claim 1, wherein the deformation producing means comprises a protuberance in a portion of the sealing surface.

6. The container-cap combination of claim 1, wherein the deformation producing means comprises said sealing surface having a first region having a height greater than the height of a second region.

7. The container-cap combination of claim 6, wherein the sealing surface is sloped from said first region of greater height to the second region.

8. The container-cap combination of claim 1, wherein the cap further comprises a depending skirt having internal threads and wherein the container further comprises external threads on said neck which engage said internal threads on the cap to thereby secure the cap in sealed relationship with the container.

9. The container-cap combination of claim 8, wherein the threads on said cap are discontinuous.

10. The container-cap combination of claim 1, wherein the sealing means includes a wall depending from the wall of the cap with a curled free end having a substantially circular cross section.

11. The container-cap combination of claim 10, wherein the curled free end includes a rim welded to the depending wall of the sealing means.

12. A container-cap combination for containing a product under vacuum or pressure comprising:
   a container including:
   (a) an opening for receiving or discharging the product,
   (b) a neck about the opening including a sealing surface; and
   (c) means integral with said sealing surface for producing a region of greater deformation in a portion of a sealing means than in the remainder of the sealing means of a cap when the cap is in sealing relationship with the container sealing surface;
   a cap including:
   (a) a top wall; and
   (b) sealing means containing plastic and having a wall depending from the top wall and a curled free end adapted to form with the sealing surface of the container a seal between the cap and the opening of the container when the cap is placed in a sealing relationship with the container, wherein the curled free end in contact with the deformation means of the sealing surface has a region of greater deformation than the remainder of the curled free end, and wherein a space is adapted to be formed between the region of greater deformity in the curled free end and the deformation means for releasing vacuum or pressure from the container when the greater deformity in the curled free end is moved out of alignment with the deformation means of the sealing surface by a predetermined movement of the cap.

13. The container-cap combination of claim 12, wherein the neck and sealing surface thereof are annular, and wherein said curled free end of the sealing means has a correspondingly annular configuration and a substantially circular cross section.

14. A method of sealing and unsealing a cap from a container comprising:
   (a) placing a cap in sealed relationship to the container, said cap comprising;
   (1) a top wall, and
   (2) sealing means adapted to form a seal between the cap and the opening of the container, a portion of the sealing means having a region of greater deformation than the remainder of the sealing means when the cap is placed in sealed relationship with the container, said container comprising;

(1) an opening for receiving or discharging a product,
(2) a neck surrounding the opening including a sealing surface, and
(3) means integral with said sealing surface for producing a region of greater deformation in a portion of the sealing means than the remainder of the sealing means of the cap when the cap is in sealed relationship with the container, and (b) moving said cap a sufficient distance so that the region of greater deformity in the sealing means is placed out of alignment with the deformation producing means of the container to thereby provide a space between the region of greater deformity of the sealing means and the deformation means of the container.

15. The method of claim 14, wherein the deformation producing means comprises a protuberance in a portion of the sealing surface of the container.

16. The method of claim 14, wherein the deformation producing means comprises said sealing surface having a first region having a height greater than the height of a second region.

17. The method of claim 16, wherein the sealing surface is sloped from said first region of greater height to the second region.

* * * * *